United States Patent
Tajima et al.

[11] Patent Number: 5,988,214
[45] Date of Patent: *Nov. 23, 1999

[54] PRESSURE-REGULATING VALVE MOUNTED IN BASE-MOUNTED TRANSFER VALVE

[75] Inventors: Masamichi Tajima; Hiroyuki Katsuta; Makoto Ishikawa, all of Yawara-mura, Japan

[73] Assignee: SMC Corporation, Tokyo, Japan

[*] Notice: This patent is subject to a terminal disclaimer.

[21] Appl. No.: 09/042,846

[22] Filed: Mar. 17, 1998

[30] Foreign Application Priority Data

Apr. 3, 1997 [JP] Japan .................................. 9-100945
Apr. 3, 1997 [JP] Japan .................................. 9-100946

[51] Int. Cl.$^6$ ............................................. F15B 13/043
[52] U.S. Cl. ...................... 137/596; 137/116.5; 137/884
[58] Field of Search ............................. 137/116.5, 596, 137/884

[56] References Cited

U.S. PATENT DOCUMENTS

| | | |
|---|---|---|
| 3,513,876 | 5/1970 | Tarbox .................................. 137/596 |
| 4,170,214 | 10/1979 | Gill et al. . |
| 4,453,565 | 6/1984 | Neff . |
| 4,726,393 | 2/1988 | Herner . |
| 4,770,210 | 9/1988 | Neff et al. . |
| 5,048,569 | 9/1991 | Stoll et al. . |
| 5,829,481 | 11/1998 | Tajima et al. .......................... 137/884 |

FOREIGN PATENT DOCUMENTS

0 822 361   2/1998   European Pat. Off. .

*Primary Examiner*—Gerald A. Michalsky
*Attorney, Agent, or Firm*—Oblon, Spivak, McClelland, Maier & Neustadt, P.C.

[57] ABSTRACT

A pressure-regulating valve, which is mounted in such a way as to be directly sandwiched between a transfer valve and a base has a valve body having substantially the same breadth as the transfer valve. The valve body contains a plurality of communication passages that allow opposed through-holes in the transfer valve and base; a pressure-regulating valve hole provided so as to traverse these communication passages; a pressure-regulating valve stem inserted into the valve hole; and means for cooperating with the pressure-regulating valve stem in regulating the air pressure in an output communication passage to a set value.

6 Claims, 9 Drawing Sheets

PRESSURE-REGULATING VALVE MOUNTED IN BASE-MOUNTED TRANSFER VALVE

FIELD OF THE INVENTION

The present invention relates to a pressure-regulating valve that is mounted in a base-mounted transfer valve to regulate the pressure of a fluid output from the transfer valve to a desired value.

PRIOR ART

To drive a fluid pressure apparatus using a pressure fluid such as compressed air that is supplied through a transfer valve, the pressure of the fluid supplied to the fluid pressure apparatus must sometimes be regulated depending on the set pressure or operating condition of the apparatus. To regulate the fluid pressure in this manner, a pressure-regulating valve such as a pressure-reducing valve is mounted in a pipe connecting an output port in the transfer valve to the fluid pressure apparatus.

Conventional pressure-regulating valves are generally large, so when such a pressure-regulating valve is connected to the transfer valve using piping, the piping operation is very cumbersome and a large installation space is required. This problem is likely to occur when a plurality of transfer valves are mounted on a base member such as a manifold or a sub-plate and if pressure-regulating valves identical in number to the transfer valves must thus be connected. In such a case, the pressure-regulating valves may be difficult to mount depending on the number of transfer valves used. This problem is significant given recent trends for reducing the size of transfer valves.

To solve this problem, the inventors have proposed in Japanese Patent Application Laid Open No. 8-219405 a small pressure-regulating valve that can be directly assembled between a transfer valve and a base. This pressure-regulating valve has a reasonable design structure with a plurality of channels and pressure-regulating mechanisms integrated in a small valve body.

Figure 15:
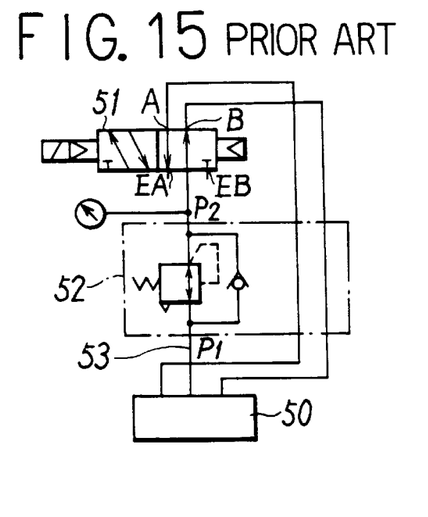
FIG. 15 is a circuit diagram showing an example of a pressure-regulating valve according to the prior application using symbols.
Figure 16:
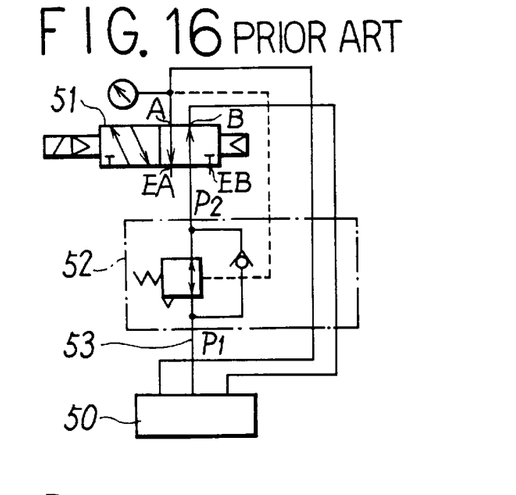
FIG. 16 is a circuit diagram showing another example of a pressure-regulating valve according to the prior application using symbols.
Figure 17:
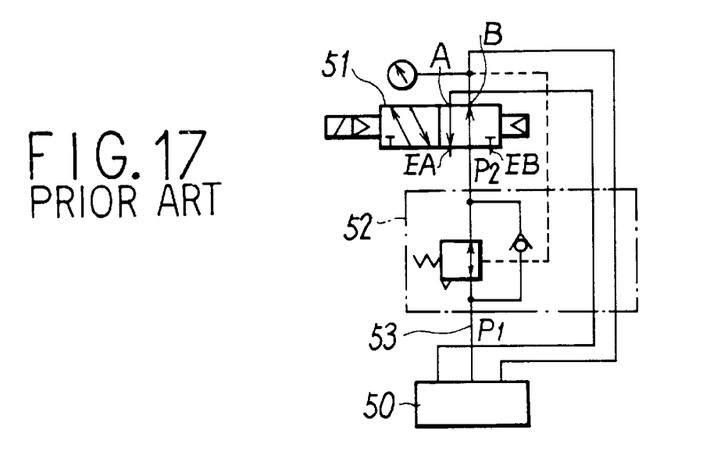
FIG. 17 is a circuit diagram showing yet another example of a pressure-regulating valve according to the prior application using symbols.

The pressure-regulating valves shown in the embodiments of this application reduce the pressure of a fluid supplied from the base to the transfer valve in order to indirectly regulate the output fluid pressure of the transfer valve to a set value, but do not directly control the output fluid pressure from the transfer valve. That is, a supply channel 53 for a pressure fluid connecting a base 50 to a transfer valve 51 is opened and closed depending on the secondary pressure of a pressure-regulating valve 52, as shown in FIG. 15 or on the output fluid pressure from one of output ports A and B in the transfer valve 51, as shown in FIG. 17 or 18.

Figure 18:
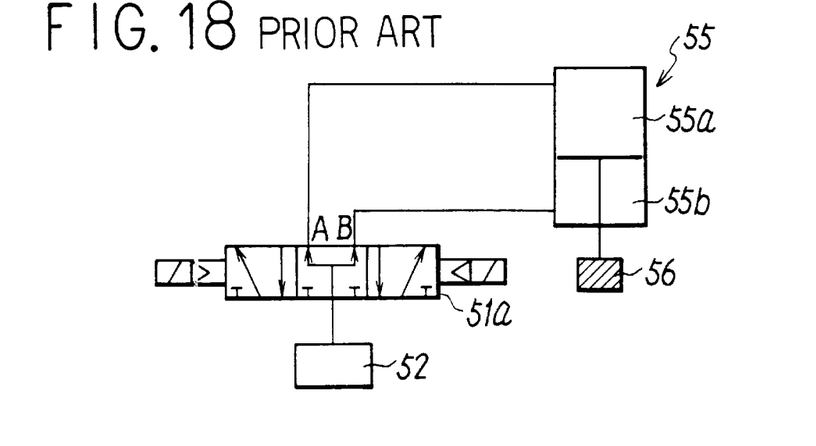
FIG. 18 is a circuit diagram showing an example of the use of a pressure-regulating valve according to the prior application using symbols.

Thus, when the pressure-regulating valve 52 is connected to an open-center, three-position transfer valve 51a and when the transfer valve 51a is in its central position, the pressure of a fluid output from the output ports A and B becomes equal to a value set by the pressure-regulating valve 52, as shown in FIG. 18. Thus, in a cylinder 55 constituting a lifter for elevating and lowering a load 56, in order to balance the lifter in the correct position, this apparatus does not allow different fluid pressures to be simultaneously supplied to both pressure chambers 55a and 55b.

DISCLOSURE OF THE INVENTION

It is an object of this invention to provide a pressure-regulating valve that is small enough to be simply assembled between the base and the transfer valve and that can directly regulate the pressure of a fluid from the transfer valve.

To achieve this object, this invention provides a small pressure-regulating valve that is installed between a transfer valve having one supply through-hole, two output through-holes, and two ejection through-holes, and a base having one supply through-hole, two output through-holes, and two ejection through-holes corresponding to those respective through-holes in order to regulate the pressure of a fluid output from the base to an actuator.

A valve body of the pressure-regulating valve has a breadth that is substantially the same as the breadth of the transfer valve and can be mounted between the transfer valve and the base so as not protrude sidewards.

An opening and closing communication passage that allows a set of the opposed output through-holes in the transfer valve and base to communicate mutually via a pressure-regulating valve seat; and a direct communication passage that allows the other opposed through-holes in the transfer valve and base to directly communicate mutually are provided inside the valve body in parallel. A pressure-regulating valve hole is also provided inside the valve body so as to traverse each of the communication passages, and a valve stem for pressure regulation including a pressure-regulating member is inserted into the pressure-regulating valve hole.

The pressure-regulating valve hole is in communication with the opening and closing communication passage but not with the direct communication passage. This valve hole does not entirely occlude the direct communication passage but penetrates it while maintaining a required flow passage cross section around it.

In addition, a pressure-regulating piston and a pressure-regulating spring are provided in a pressure-regulating chamber installed at one end of the pressure-regulating valve stem, a return spring is provided in a return chamber at the other end of the pressure-regulating valve stem, and a pressure-regulating passage allowing the pressure-regulating chamber to communicate with the return chamber is formed in parallel with the pressure-regulating valve hole.

Furthermore, a lead channel for leading a pressure fluid for pressure regulation from the secondary part of the opening and closing communication passage to the pressure-regulating and return chambers is provided in the valve body.

In the pressure-regulating valve of this configuration, the plurality of communication passages allowing the opposed through-holes in the transfer valve and base to communicate mutually; and the pressure-regulating valve hole in which the pressure-regulating valve stem is accommodated are disposed inside the valve body at duplicate positions, thereby enabling the internal space to be used effectively. As a result, the breadth of the valve body can be reduced so as to be substantially the same as that of the transfer valve.

In addition, since the pressure-regulating valve seat provided is one of the two communication passages connecting the two sets of opposed output through-holes in the transfer valve and base together in order to open and close the output communication passages depending on the secondary fluid pressure in the pressure-regulating valve seat, one of the pressure values of the fluid from the two output ports in the transfer valve can be directly regulated to a set value. Consequently, when, for example, this pressure-regulating valve is connected to an open-center, three-position transfer valve, a fluid of differing pressures can be simultaneously output from the two output ports in the central position of the transfer valve.

According to a preferred embodiment of this invention, the pressure-regulating valve hole and pressure-regulating passage are provided adjacent to each other in the flow passage direction of the communication passages. This configuration can reduce the decrease in flow passage cross section to allow a required flow passage cross section to be reliably maintained, compared to the pressure-regulating valve and pressure-regulating path provided in the groove width direction of the communication passages.

According to a specific embodiment, the opening and closing communication passage is composed of a first part in communication with the output through-hole in the transfer valve and opened into the pressure-regulating valve hole; and a second part in communication with the output throughhole in the base and opened at a position different from the position in the first part, with the pressure-regulating valve seat provided between the first and second parts.

According to one embodiment of this invention, the lead channel is a lead hole connecting the second part of the opening and closing communication passage to the pressure-regulating passage.

According to another specific embodiment of this invention, the second part of the opening and closing communication passage is in communication with the pressure-regulating valve hole at a position closer to the return chamber than the first part, the lead channel is composed of that part of a gap formed in the outer circumference of the pressure-regulating valve stem which is located between the second part and the return chamber, and that part of the gap formed in the outer circumference of the pressure-regulating valve stem which is located between the first part of the opening and closing communication passage and the pressure-regulating chamber is sealed by a single seal member mounted on the pressure-regulating valve stem.

In this configuration, only one seal member must be mounted on the pressure-regulating valve stem, so the sliding resistance of the pressure-regulating valve stem significantly decreases and the valve stem can move smoothly to enable reliable pressure regulation and to improve durability.

According to this invention, a lip seal member having a directional seal is preferably used as the seal member. The lip seal is mounted in the direction in which it prevents compressed air from flowing through the gap in the outer circumference of the pressure-regulating valve stem from the first part of the opening and closing communication passage to the pressure-regulating chamber, and yet permits flow in the opposite direction.

Thus, when the output fluid pressure is released, the pressure fluid in the pressure-regulating chamber is ejected to the exterior from the first part through the seal member, thereby eliminating the effects of any residual pressure.

DETAILED DESCRIPTION

Figure 1:
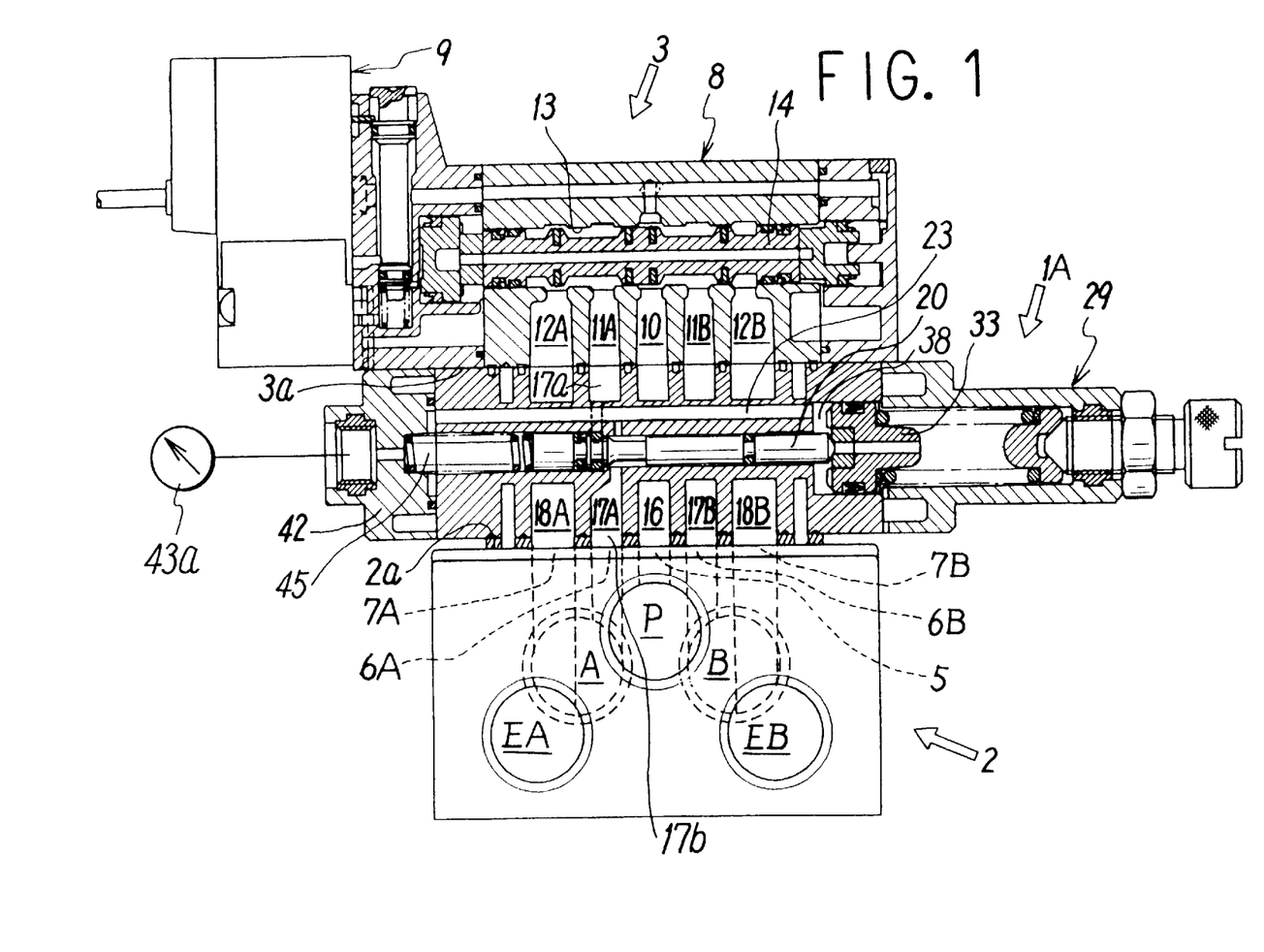
FIG. 1 is a vertical sectional view of a pressure-regulating valve according to this invention which is mounted between a base and a transfer valve.

FIG. 1 shows a pressure-regulating valve 1A according to a first embodiment of this invention which is directly mounted between a base 2 and a transfer valve 3, and the components 1A, 2, and 3 are fixed mutually using an appropriate mounting means such as set screws (not shown).

The base 2 represents members such as manifolds and sub-plates that have piping ports and is configured to mount one or more transfer valves thereon. In the figure, however, the base 2 is of a unitary type on which a single transfer valve 3 is mounted. The base 2 includes a supply port P, a first ejection port EA, and a second ejection port EB on one side and a first output port A and a second output port B on the other side. The base 2 has a flat regulating-valve mounting surface 2a in which a supply through-hole 5 in communication with each of the above ports, a first and a second output through-holes 6A and 6B, and a first and a second ejection through-holes 7A and 7B are opened in a line.

The transfer valve 3 is a two-position transfer valve of a single pilot type comprising a main valve section 8 and a solenoid-operated pilot valve section 9. The main valve section 8 includes a flat regulating-valve mounting surface 3a on the bottom surface of a valve body. A supply through-hole 10, a first and a second output through-holes 11A and 11B, and a first and a second ejection through-holes 12A and 12B are opened in the mounting surface 3a in a line. In addition, a valve hole 13 into which each of the through-holes open up is formed inside the valve body with a valve stem 14 slid into the valve hole 13 in an air-tight manner.

When a solenoid is energized to output a pilot fluid from the pilot valve section 9 to the main valve section 8, the valve stem 14 moves rightward in the figure to allow the supply through-hole 10 to communicate with the first output through-hole 11A while allowing the second output through-hole 11B to communicate with the second ejection through-hole 12B. When the solenoid is de-energized to cause the pilot fluid in the main valve section 8 to be ejected, an internal pilot fluid being supplied to the chamber opposite to the pilot valve section causes the valve stem 14 to return to the illustrated condition, thereby allowing the supply through-hole 10 to communicate with the second output through-hole 11B while allowing the first output through-hole 11A to communicate with the first ejection through-hole 12A.

The transfer valve 3, however, is not limited to the single-pilot valve illustrated, but may be of a double-pilot or a direct-operate type.

Figure 2:
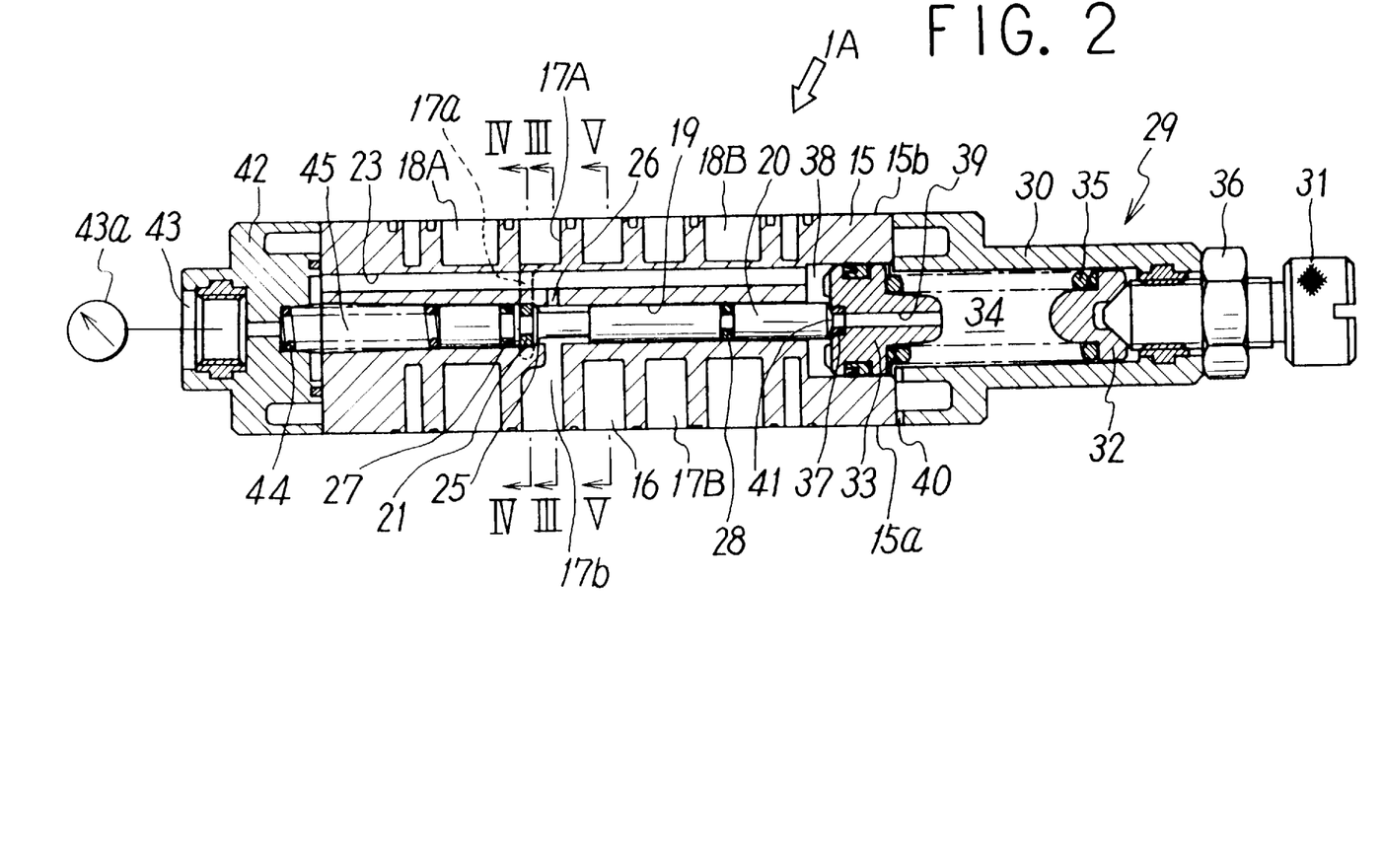
FIG. 2 is an enlarged view of the pressure-regulating valve according to the first embodiment.

As FIG. 2 shows in detail, the pressure-regulating valve 1A according to the first embodiment includes a valve body 15 of a rectangular cross section having almost the same breadth as the valve body of the transfer valve 3. The top and bottom surfaces of the valve body 15 are flat mounting surfaces 15a and 15b on which the base 2 and transfer valve 3 are mounted, and allow the pressure-regulating valve to be mounted in such a way as to be directly sandwiched between the base 2 and the transfer valve 3.

A plurality of communication passages 16, 17A, 17B, 18A, and 18B connecting the opposed through-holes in the transfer valve 3 and base 2 together are formed between the top and bottom mounting surfaces 15a and 15b. A pressure-regulating valve hole 19 traverses these communication passages, and a pressure-regulating valve stem 20 is movably inserted into the pressure-regulating valve hole 19.

Of the plurality of communication passages 16, 17A, 17B, 18A, and 18B located in a line, the first output communication passage 17A connecting the first output through-hole 6A in the base 2 and the first output through-hole 11A in the transfer valve 3 has a pressure-regulating valve seat 25 in the middle and can be opened and closed. The other communication passages, the supply communication passage 16, which connects the supply through-holes 5 to 10 in the base 2 and transfer valve 3, the second output communication passage 17B, which connects the second output through-holes 6B and 11B together, and the ejection communication passages 18A and 18B, which connect the ejection through-holes 7A and 7B to the ejection through-holes 12A and 12B, respectively, are direct communication passages that directly connect the through-holes together.

Figure 3:
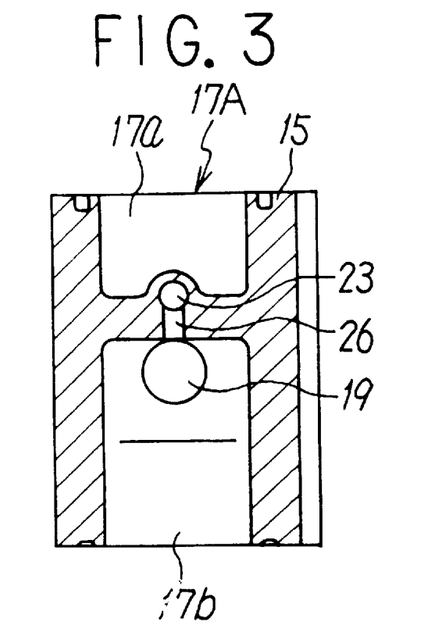
FIG. 3 is a sectional view taken along line III—III in FIG. 2.
Figure 4:
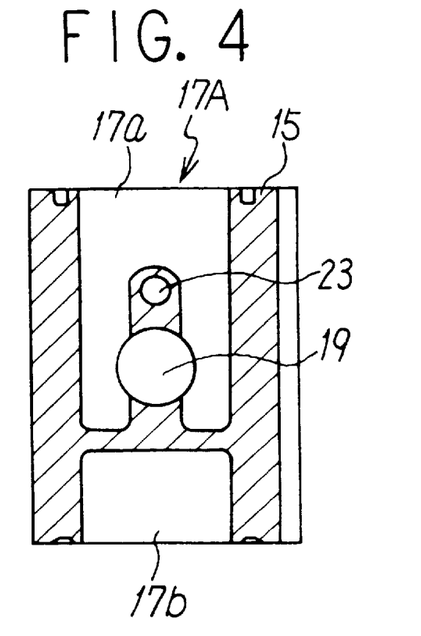
FIG. 4 is a sectional view taken along line IV—IV in FIG. 2.
Figure 5:
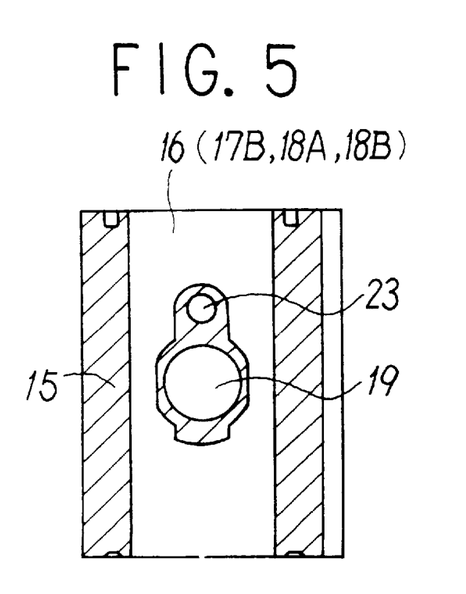
FIG. 5 is a sectional view taken along line V—V in FIG. 2.
Figure 6:
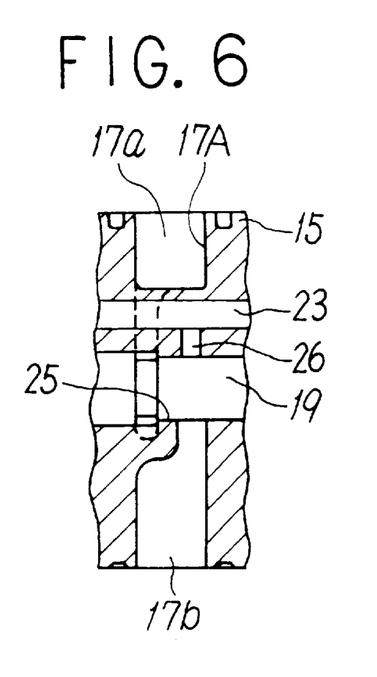
FIG. 6 is a enlarged schematic view of FIG. 2.

The opening and closing communication passage 17A is composed of a first part 17a, in communication with the first output through-hole 11A in the transfer valve 3, which opens into the pressure-regulating valve hole 19; and a second part 17b, in communication with the first output through-hole 6A, which opens at a position closer to the pressure-regulating chamber 38 than the first part 17a, as shown in FIG. 3. The pressure-regulating valve seat 25 is provided between a position at which the first part 17a of the pressure-regulating valve hole 19 opens and the position at which the second part 17b opens. The pressure-regulating valve seat 25 is opened and closed like a poppet valve from the side of the first part 17a by a pressure-regulating valve member 21.

The pressure-regulating valve hole 19 is in communication with the opening and closing communication passage 17A but not with the direct communication passages 16, 17B, 18A, and 18B. The pressure-regulating valve hole 19 penetrates the approximate center of each direct-communication passage while maintaining a gap on both sides, said gap being required to allow compressed air to flow, as shown in FIGS. 3 to 6. Since the communication A passages cross the pressure-regulating valve hole 19 in the valve body 15 in this manner, theses components can be contained in a small, efficient space, thereby allowing the valve body 15 to have a small and reasonable design structure.

A pressure-regulating section 29 for setting the output air pressure is formed at one end of the valve body 15. The pressure-regulating section 29 has the pressure-regulating chamber 38 formed between the valve body 15 and a pressure-regulating side cover 30 to communicate with the pressure-regulating valve hole 19; a pressure-regulating piston 33 slid into position in the pressure-regulating chamber 38; and a pressure-regulating spring 35 provided in a spring chamber 34 between the pressure-regulating piston 33 and a spring seat 32 behind the piston 33 in order to drive the pressure-regulating piston 33 toward the pressure-regulating valve stem 20. The driving force of the pressure-regulating spring 35 can be adjusted by moving an adjustment screw 31 forward and backward, thereby varying the set air pressure. Reference numeral 36 is a lock nut that locks the pressure-regulating screw 31.

An exhaust hole 39 that is opened to the atmosphere through the spring chamber 34 and a breather hole 40 is formed in the pressure-regulating piston 33. A relief valve member 37 is provided at the tip of the exhaust hole 39 and opened and closed by a tapered valve opening and closing section 41 at the tip of the pressure-regulating valve stem 20.

Between the valve body 15 and a return-side cover 42, the return chamber 45 in communication with the pressure-regulating valve hole 19 is formed at the other end of the valve body 15, and a return spring 44 that drives the pressure-regulating valve stem 20 toward the pressure-regulating piston 33. The driving force of the return spring 44 is smaller than that of the pressure-regulating spring 35.

The return chamber 45 is in communication with a detection port 43, provided in the return-side cover 42, via a through-hole so that a pressure gauge 43a mounted on the detection port 43 can detect air pressure adjustments.

A pressure-regulating passage 23 connecting the pressure-regulating chamber 38 to the return chamber 45 is provided adjacent to the flow passage direction of the communication passage and in parallel with the pressure-regulating valve hole 19, and the pressure-regulating passage 23 is connected to the second 17b part of the opening and closing communication passage 17A through a lead hole 26. Since the pressure-regulating valve hole 19 and the pressure-regulating passage 23 are located as described above, the decrease in flow passage cross section is reduced to reliably provide a required flow passage cross section, compared to the positioning of these components in line in the groove width direction.

A first seal member 27 that seals the first part 17a of the opening and closing communication passage 17A and the return chamber 45 and a second seal member 28 that seals the second part 17b and the pressure-regulating chamber 38 are mounted on the outer circumference of the pressure-regulating valve stem 20. The first seal member 27 is a lip seal having a directional seal function and is mounted in the direction in which it prevents the flow of a fluid flowing through the gap in the outer circumference of the pressure-regulating valve stem 20 from the first part 17a to the return chamber 45; said seal member 27 allows fluid to flow in the opposite direction. On the other hand, the second seal member 28 is an O ring having a non-directional seal function.

In FIGS. 1 and 2, while no compressed air is supplied from the supply port P in the base 2 to the transfer valve 3, the driving force of the pressure-regulating spring 35 causes the pressure-regulating piston 33 and pressure-regulating valve stem 20 to move leftward in the figure and the pressure-regulating valve member 21 opens the pressure-regulating valve seat 25. Thus, the first and second parts 17a and 17b of the opening and closing communication passage 17A are in communication with each other.

When supplied from the supply port P to the transfer valve 3 through the supply communication passage 16 in the pressure-regulating valve 1, compressed air is output from the second output through-hole 11B in the transfer valve 3 to an actuator (not shown) through the second output communication passage 17B in the pressure-regulating valve 1 and the second output through-hole 6B and second output port B in the base 2. The pressure of air output from the second output port B is the same as the pressure of air supplied from the supply port P.

When the transfer valve 3 is switched by the pilot valve 9 to a position opposite to the position shown in FIG. 1, the supply through-hole 10 and first output through-hole 11A in the transfer valve 3 communicate mutually to cause the compressed air to be output from the supply through-hole 10 to the actuator through the first output through-hole 11A, the first output communication passage 17A in the pressure-regulating valve 1, and the first output through-hole 6A and first output port A in the base 2.

In addition, used compressed air ejected from the actuator is ejected from the second output port B to the exterior through the second output through-hole 6B, second output communication passage 17B, second output through-hole 11B, second ejection through-hole 12B, second ejection communication passage 18B, second ejection through-hole 7B, and second ejection port EB.

At the same time, the compressed air output from the first output port A flows from the second part 17b that is the secondary side of the opening and closing communication passage 17A, through the lead hole 26 into the pressure-regulating passage 23 and then into the pressure-reducing chamber 38 and return chamber 45. Thus, the combination of an air pressure force that directly acts on the piston 33 and the driving force of the return spring 44 that acts via the pressure-reducing valve stem 20 causes the pressure-reducing piston 33 to be driven in the direction in which the pressure-reducing spring 35 is compressed. The pressure-reducing piston 33 moves backward while being compressed until the combined force and the driving force of the pressure-regulating spring 35 become balanced. Then, the pressure-regulating valve member 21 closes the pressure-regulating valve seat 25, thereby causing the first and second parts 17a and 17b of the opening and closing communication passage 17A to be blocked.

If the force of the air pressure acting on the pressure-regulating piston 33 is larger than the driving force of the pressure-regulating spring 35, the pressure-reducing piston 33 moves further back to open the relief valve member 37, causing the compressed air in the pressure-reducing chamber 38 to be ejected to the exterior and thereby maintaining the balance between the acting force of the air pressure and the driving force of the pressure-reducing spring 35.

Thus, the air pressure in the second part 17b of the opening and closing communication passage 17A is regulated to the set value. The air pressure can be detected by a pressure gauge 43a mounted on the detection port 43.

The air pressure setting can be varied by moving the pressure-regulating screw 31 forward and backward to adjust the driving force of the pressure-regulating spring 35.

In addition, when the pilot valve 9 is turned off to switch the transfer valve 3 to the state shown in FIG. 1, used compressed air from the first output port A is ejected to the exterior through the first output through-hole 6A, first output communication passage 17A, first output through-hole 11A, first ejection through-hole 12A, first ejection communication passage 18A, first ejection through-hole 7A, and first ejection port EA. At this point, the compressed air in the pressure-regulating chamber 38 and return chamber 45 is ejected to the first part 17a of the opening and closing communication passage 17A through the first seal member 27, thereby eliminating the effects of any residual pressure.

Figure 12:
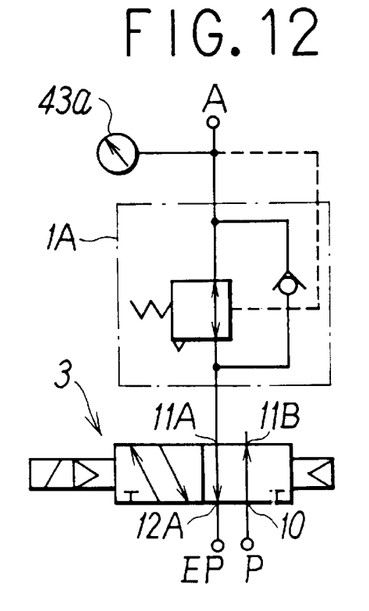
FIG. 12 is a circuit diagram showing an example of the operational condition of the pressure-regulating valve in FIG. 2 using symbols.

FIG. 12 employs symbols to demonstrate a state in which the pressure-regulating valve 1A according to the first embodiment and the transfer valve 3 are connected together.

Figure 14:
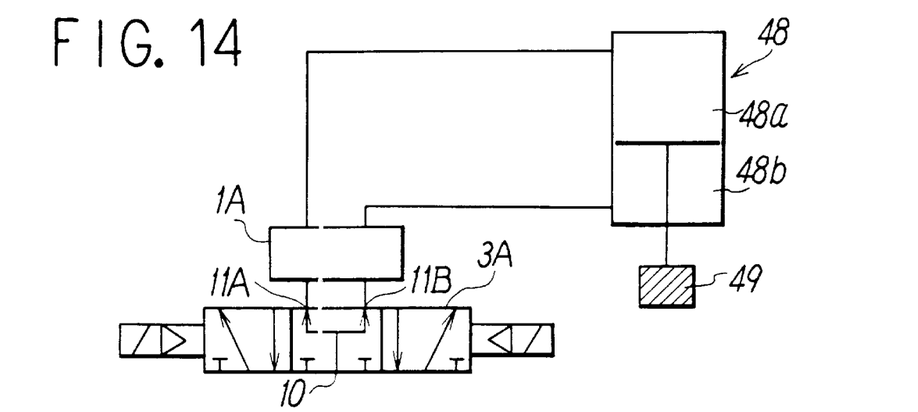
FIG. 14 is a circuit diagram showing another example of the operational condition of the pressure-regulating valve according to this invention.

As another example of the use of the pressure-regulating valve 1A, FIG. 14 employs symbols to show the pressure-regulating valve 1A connected to the center-open three-position transfer valve 3A, which is used to control a lifter 48. In this example, when the transfer valve 3A is in its central position, compressed air is simultaneously output from the two output through-holes 11A and 11B in the transfer valve 3A to two pressure chambers 48a and 48b in the lifter 48 through the pressure-regulating valve 1A and base (not shown). The air pressure output to the upper pressure chamber 48a can then be reduced by the pressure-regulating valve 1A to stop the lifter 48 in its central position in which the acting force of the air pressure and a load 49 are balanced.

Figure 7:
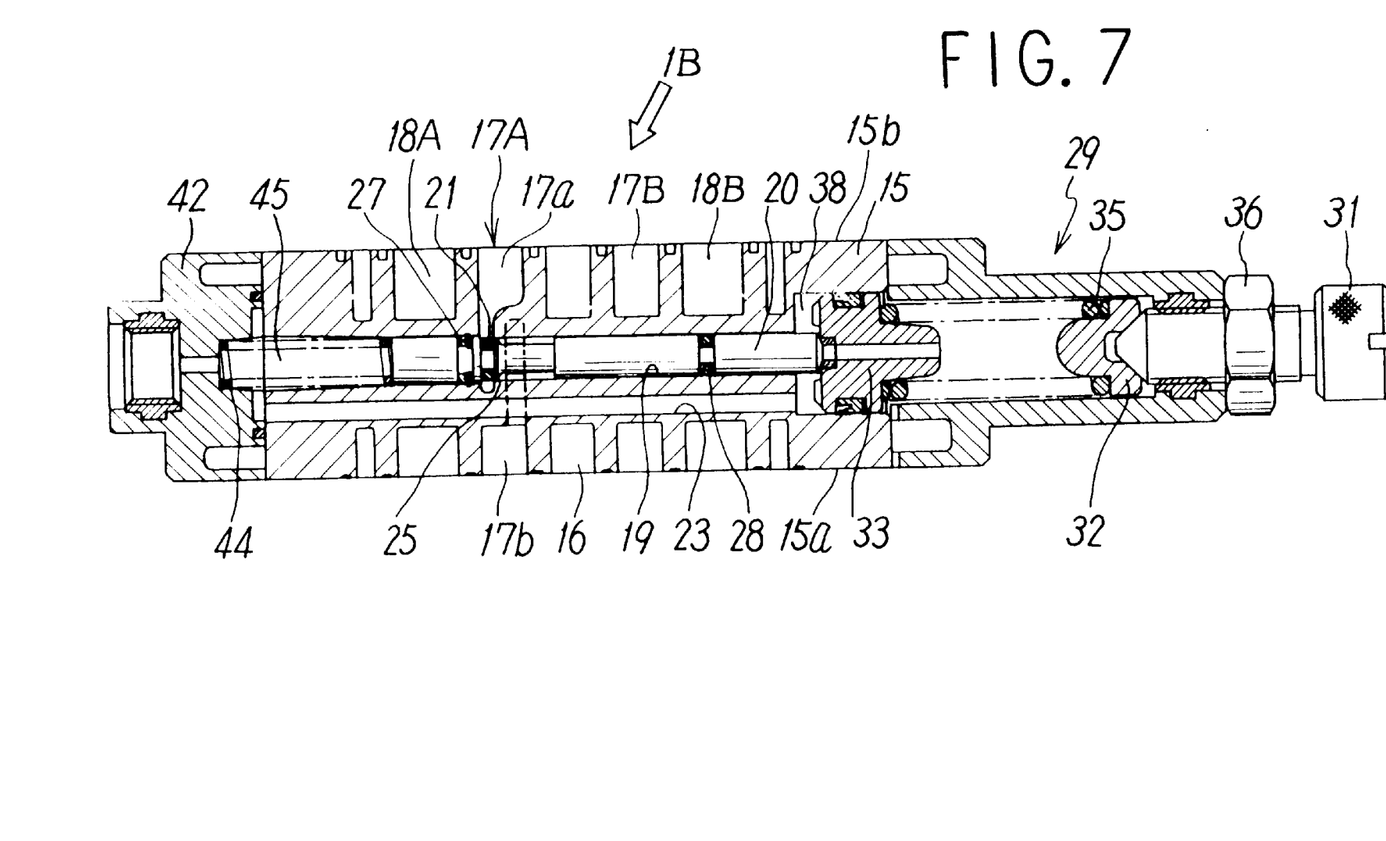
FIG. 7 is a sectional view of a second embodiment of this invention.

FIG. 7 shows a second embodiment of a pressure-regulating valve according to this invention. Compared to the pressure-regulating passage 23 formed closer to the transfer valve mounting surface 15b than the pressure-regulating valve hole 19, the pressure-regulating passage 23 of the pressure-regulating valve 1B according to the second embodiment is formed closer to the base mounting surface 15a than the pressure-regulating valve hole 19. The other configuration is substantially the same as in the first embodiment, so identical major components have the same reference numerals as in the first embodiment and their description is omitted.

Figure 8:
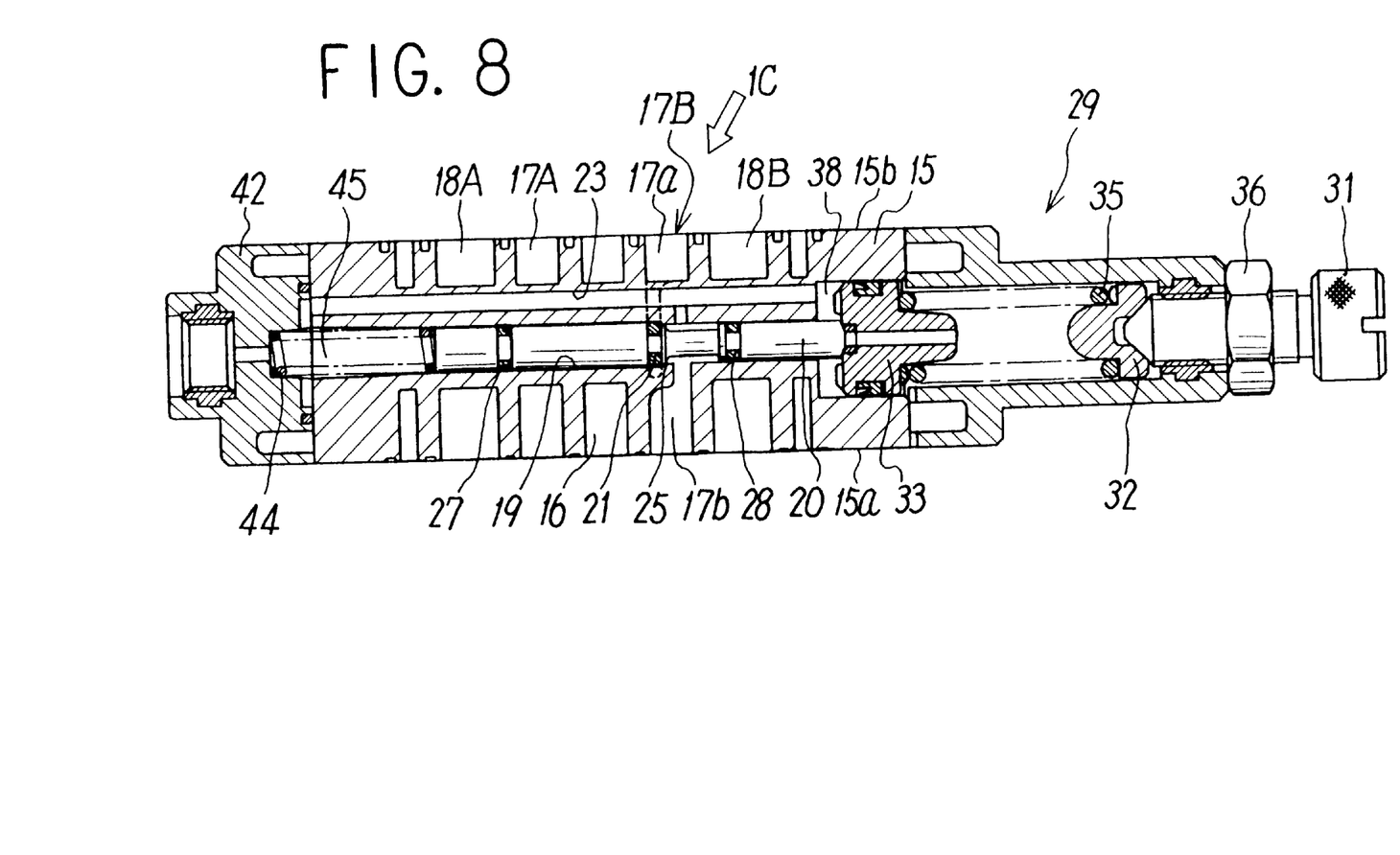
FIG. 8 is a sectional view of a third embodiment of this invention.

FIG. 8 shows a third embodiment of a pressure-regulating valve according to this invention. A pressure-regulating valve 1C differs from the pressure-regulating valve 1A according to the first embodiment in that the second output communication passage 17B acts as an opening and closing communication passage to regulate the pressure of air output from the second output port B through the second output communication passage 17B.

The other configurations and operations are substantially the same as in the first embodiment.

In the third embodiment, just as in the second embodiment, the pressure-regulating passage 23 can be formed closer to the base mounting surface 15a than the pressure-regulating valve hole 19.

Figure 13:
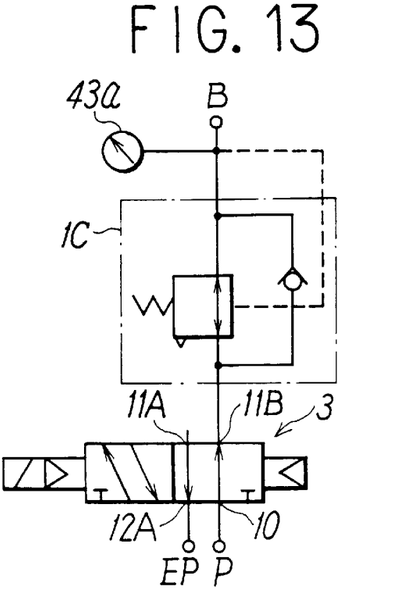
FIG. 13 is a circuit diagram showing an example of the operational condition of the pressure-regulating valve in FIG. 7 using symbols.

FIG. 13 uses symbols to illustrate a state in which the pressure-regulating valve 1C according to the third embodiment and the transfer valve 3 are connected together.

Figure 9:
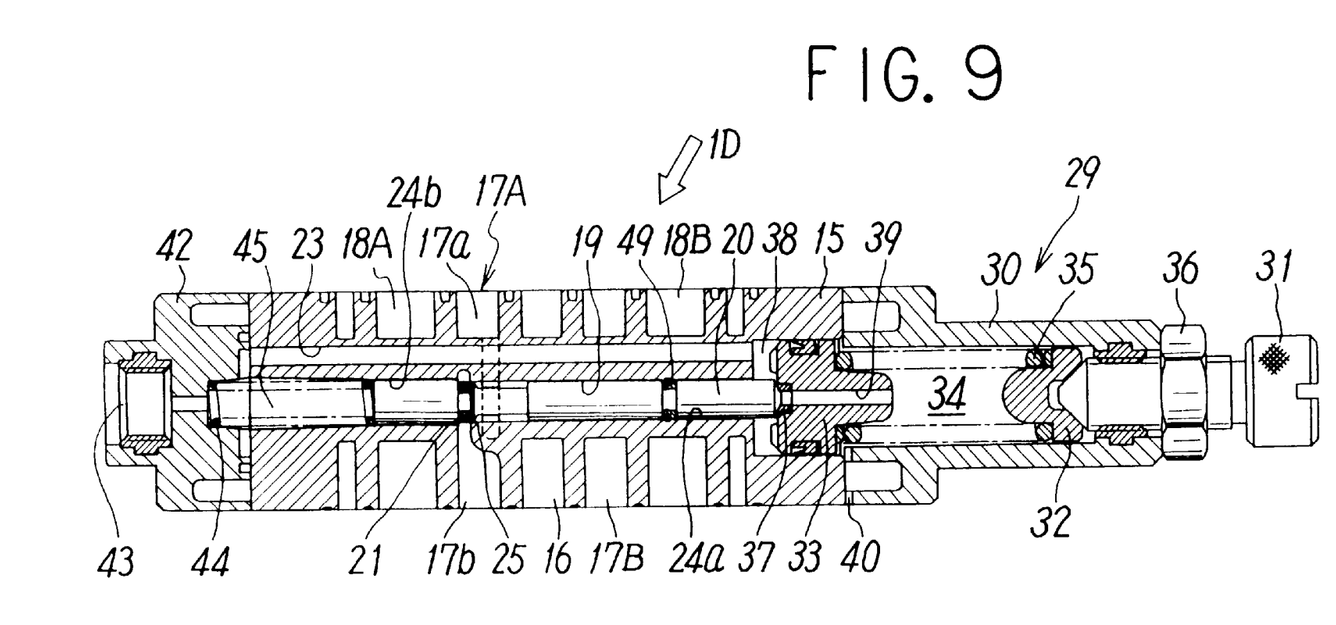
FIG. 9 is a sectional view of a fourth embodiment of this invention.

FIG. 9 shows a fourth embodiment of a pressure-regulating valve according to this invention. A pressure-regulating valve 1D according to the fourth embodiment differs from the pressure-regulating valve 1A according to the first embodiment in the method for introducing air for pressure regulation into the pressure-regulating chamber 38 and return chamber 45 and in that only one seal member 49 is mounted on the pressure-regulating valve stem 20.

In the pressure-regulating valve 1D, the second part 17b of the first output communication passage 17A acting as an opening and closing communication passage is in communication with the pressure-regulating valve hole 19 at a position closer to the return chamber 45 than the first part 17a of the pressure-regulating valve hole 19; and the pressure-regulating valve seat 25 is formed on the side of the second part 17b and opened and closed from the side of the second part 17b by the pressure-regulating valve member 21. A gap 24b in the outer circumference of the pressure-regulating valve stem 20 which connects the second part 17b to the return chamber 45 forms a lead channel so that compressed air for pressure regulation is introduced from the second part 17b into the return chamber 45 through the gap 24b and is then guided to the pressure-regulating chamber 38 via the pressure-regulating passage 23. On the other hand, the gap 24a in the outer circumference of the pressure-reducing valve stem 20 which connects the first part 17a to pressure-regulating chamber 38 is sealed by a lip seal member 49 having a directional seal in such a way as to prevent compressed air from flowing from the first part 17a toward the pressure-regulating chamber 38.

By mounting only one seal member 49 on the pressure-regulating valve stem 20 in this manner, the sliding resistance of the pressure-regulating valve stem 20 can be significantly reduced to enable the valve stem 20 to be moved smoothly, thereby providing reliable pressure regulation and improving the durability. In addition, since the seal member 49 is a lip seal having directionality, the output fluid pressure can be released to cause the pressure fluid in the pressure-regulating chamber 38 to be ejected from the first part 17a of the opening and closing communication passage 17A to the exterior through the seal member 49, thereby eliminating the effects of any residual pressure.

The other configuration and operation of the fourth embodiment is substantially the same as in the first embodiment, so identical major components have the same reference numerals as in the first embodiment and their description is omitted.

Figure 10:
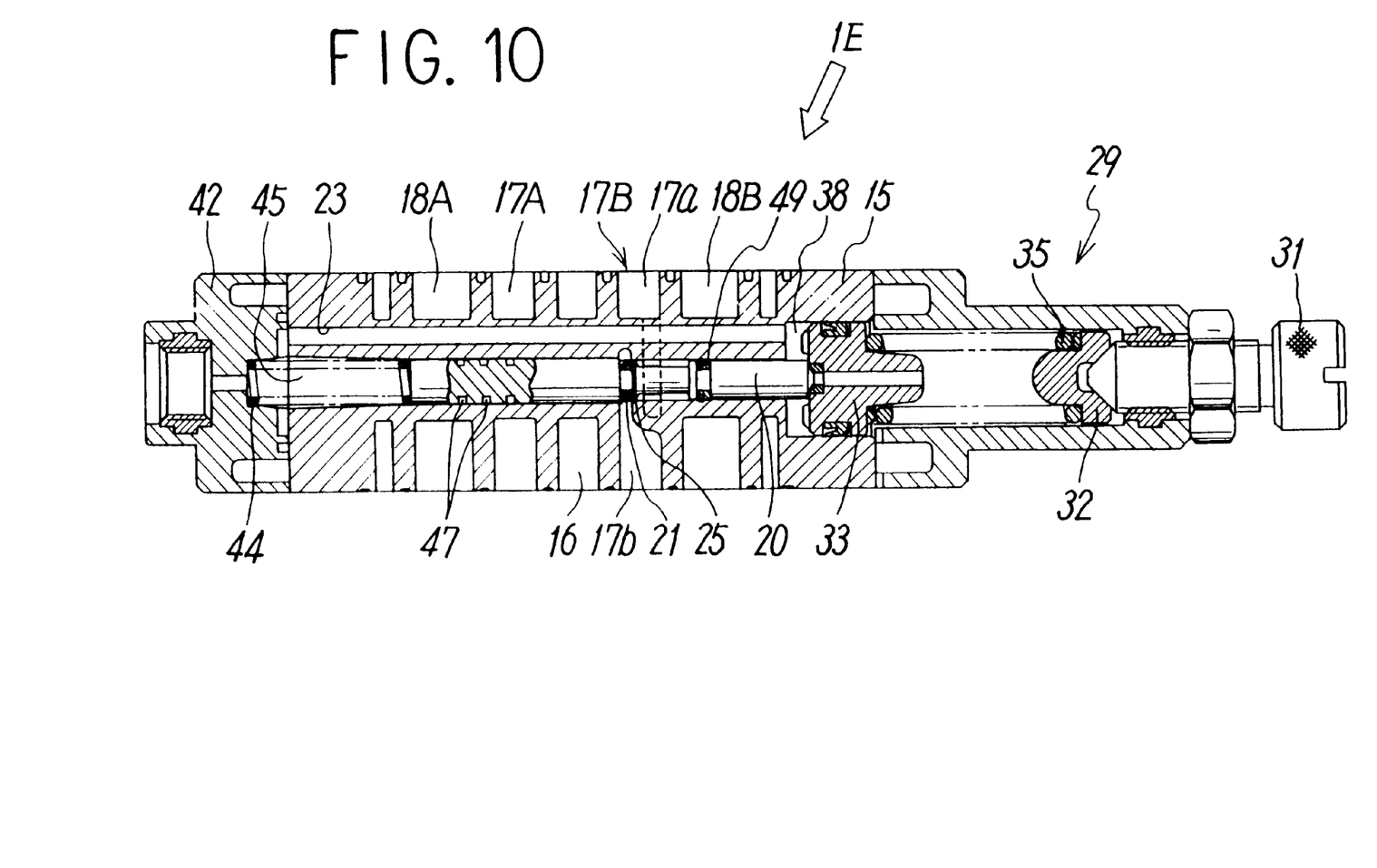
FIG. 10 is a sectional view of a fifth embodiment of this invention.

FIG. 10 shows a fifth embodiment of a pressure-regulating valve according to this invention. A pressure-regulating valve 1E differs from the fourth embodiment in that the second output communication passage 17B acts as an opening and closing communication passage to adjust the pressure of air output from the second output port B in the base through the second output communication passage 17B.

In this case, one or more annular grooves 47 can be formed in the outer circumference of the pressure-regulating valve stem 20 to further reduce sliding resistance.

The other configuration and operation are substantially the same as in the fourth embodiment, so identical major components have the same reference numerals as in the fourth embodiment and their description is omitted.

Figure 11:
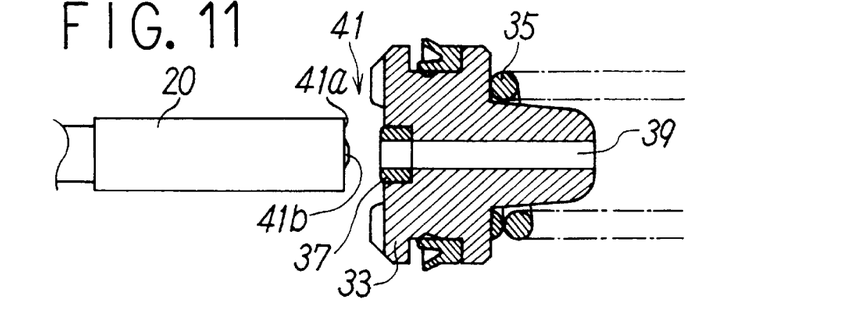
FIG. 11 shows a configuration of a relief means that is preferably applicable to a regulating valve according to this invention.

FIG. 11 shows a different structure for the valve opening and closing section 41 at the end of the pressure-regulating valve stem 20 that is preferably applicable to the pressure-regulating valve in each of the above embodiments. The valve opening and closing section 41 is composed of a flat and annular abutting surface 41a that abuts the end surface of the pressure-regulating piston 33; and a protruding portion 41b that protrudes from the abutting surface to open and close the relief valve member 37.

In this configuration of the valve opening and closing section 41, when the pressure-regulating valve stem 20 moves rightward to cause the protruding portion 41b to close the relief valve member 37, the annular abutting surface 41a abuts the end surface of the pressure-regulating piston 33 to prevent the relief valve member 37 from being excessively deformed by a pressure on the valve stem.

What is claimed is:

1. A pressure-regulating valve installed between a transfer valve having one supply through-hole, two output through-holes, and two ejection through-holes, and a base having one supply through-hole, two output through-holes, and two ejection through-holes corresponding to these respective through-holes in order to regulate the pressure of a fluid output from said transfer valve through the base, comprising:

a valve body having a breadth that is substantially the same as the breadth of said transfer valve and that is mounted in such a way as to be directly sandwiched between the transfer valve and said base;

an opening and closing communication passage that allows a set of the opposed output through-holes in the transfer valve and base to communicate mutually via a pressure-regulating valve seat; and a direct communication passage that allows the other opposed through-holes in the transfer valve and base to directly communicate with one another;

a pressure-regulating valve hole having said pressure-regulating valve seat in part thereof, the pressure-regulating valve hole provided inside said valve body so as to traverse each of said communication passages, being in communication with the opening and closing communication passage but not with the direct communication passage, and penetrating the direct communication passage while maintaining a required flow passage cross section around;

a pressure-regulating valve stem movably provided in said pressure-regulating valve hole;

a pressure-regulating valve member provided on said pressure-regulating valve stem to open and close said pressure-regulating valve seat;

a pressure-regulating chamber installed at one end of said pressure-regulating valve stem; a pressure-regulating piston slid into position in the pressure-regulating chamber; a pressure-regulating spring that urges the pressure-regulating piston toward the pressure-regulating valve stem;

a return chamber provided at the other end of said pressure-regulating valve stem; a return spring provided in the return chamber to drive the pressure-regulating valve stem toward the pressure-regulating piston;

a pressure-regulating passage provided inside said valve body to allow said pressure-regulating chamber to communicate with said return chamber; and a lead channel for leading a pressure fluid for pressure regulation from a secondary part of said opening and closing communication passage to said pressure-regulating and return chambers.

2. A pressure-regulating valve according to claim 1 wherein said pressure-regulating passage is formed in parallel with the pressure-regulating valve hole and wherein the pressure-regulating passage and pressure-regulating valve hole are located adjacent to each other in the flow passage direction of said communication passages.

3. A pressure-regulating valve according to claim 1 or 2 wherein said opening and closing communication passage is composed of a first part in communication with the output through-hole in the transfer valve and opened into said pressure-regulating valve hole; and a second part in communication with the output through-hole in the base and opened at a position different from the position in the first part, with said pressure-regulating valve seat provided between the first and second part.

4. A pressure-regulating valve according to claim 3 wherein said lead channel is a lead hole connecting said second part of said opening and closing communication passage to said pressure-regulating passage.

5. A pressure-regulating valve according to claim 3 wherein said second part of said opening and closing communication passage is in communication with the pressure-regulating valve hole at a position closer to the return chamber than the first part, wherein said lead channel is composed of that part of a gap formed in the outer circumference of the pressure-regulating valve stem which is located between said second part and said return chamber, and wherein that part of the gap formed in the outer circumference of the pressure-regulating valve stem which is located between the first part of the opening and closing communication passage and the pressure-regulating chamber is sealed by a single seal member mounted on said pressure-regulating valve stem.

6. A pressure-regulating valve according to claim 5 wherein said seal member is a lip seal having a directional seal function which is mounted so as to prevent compressed air from flowing through the gap in the outer circumference of said pressure-regulating valve stem from the first part of the opening and closing communication passage to the pressure-regulating chamber, while permitting flow in the opposite direction.

* * * * *